(12) United States Patent
Tsukada et al.

(10) Patent No.: US 12,414,541 B2
(45) Date of Patent: Sep. 16, 2025

(54) FLUID SUPPLY APPARATUS

(71) Applicants: TSUKADA MEDICAL RESEARCH CO., LTD., Tokyo (JP); JAPAN AEROSPACE EXPLORATION AGENCY, Chofu (JP); MITSUBISHI HEAVY INDUSTRIES, LTD., Tokyo (JP)

(72) Inventors: Osamu Tsukada, Tokyo (JP); Akihiko Nakasa, Tokyo (JP); Jumpei Yoshida, Tokyo (JP); Hiroyasu Mizuno, Tokyo (JP); Dai Shiba, Tokyo (JP); Teruhiro Senkoji, Tokyo (JP); Yusuke Hagiwara, Tokyo (JP)

(73) Assignees: TSUKADA MEDICAL RESEARCH CO., LTD., Tokyo (JP); MITSUBISHI HEAVY INDUSTRIES, LTD., Tokyo (JP)

( * ) Notice: Subject to any disclaimer, the term of this patent is extended or adjusted under 35 U.S.C. 154(b) by 111 days.

(21) Appl. No.: 18/231,477

(22) Filed: Aug. 8, 2023

(65) Prior Publication Data

US 2024/0049684 A1   Feb. 15, 2024

(30) Foreign Application Priority Data

Aug. 9, 2022 (JP) ................................. 2022-126827

(51) Int. Cl.
*A01K 7/02* (2006.01)
*B67D 3/04* (2006.01)

(52) U.S. Cl.
CPC ................ *A01K 7/02* (2013.01); *B67D 3/042* (2013.01)

(58) Field of Classification Search
CPC ........ B67D 1/0894; B67D 3/042; A01K 7/02; A01K 7/025; A01K 5/0275; A61M 5/152; B65D 83/0061; F16K 15/20; F16K 7/10
USPC ................................. 137/571, 232, 227, 225
See application file for complete search history.

(56) References Cited

U.S. PATENT DOCUMENTS

| | | | | |
|---|---|---|---|---|
| 2,518,145 A | * | 8/1950 | Jenson ..................... | B67D 3/00 222/386.5 |
| 5,137,175 A | * | 8/1992 | Kowalski ............. | B67D 1/0462 222/105 |
| 9,828,170 B2 | * | 11/2017 | Nomura ................ | B65B 31/003 |
| 10,160,592 B2 | * | 12/2018 | Sugawara .............. | B65D 83/38 |

(Continued)

FOREIGN PATENT DOCUMENTS

JP        2002017191 A      1/2002

*Primary Examiner* — Kelsey E Cary
(74) *Attorney, Agent, or Firm* — Harness, Dickey & Pierce, P.L.C.

(57) ABSTRACT

A fluid supply apparatus that can eliminate the need for a power supply source, and store fluid efficiently. The apparatus may comprise a first balloon that is formed of an elastic body to be capable of storing the fluid, a second balloon that is formed of an elastic body to be capable of storing the fluid, and has a larger contraction force than a contraction force of the first balloon, a support member that supports both of the first balloon and the second balloon, and a casing that houses the first balloon and the second balloon, and defines inflation ranges of the first balloon and the second balloon, in which the support member has a flow path formed to permit fluid communication between an interior of the first balloon and an interior of the second balloon.

14 Claims, 9 Drawing Sheets

(56) References Cited

U.S. PATENT DOCUMENTS

2006/0054634 A1\* 3/2006 Mekata ............... B05B 11/1081
  222/105
2009/0108021 A1\* 4/2009 Hansen .............. C12N 15/8247
  222/105

\* cited by examiner

FLUID SUPPLY APPARATUS

CROSS-REFERENCE TO RELATED APPLICATIONS

This application claims the benefit and priority of Japanese Application No. 2022-126827, filed Aug. 9, 2022. The entire disclosure of the above application is incorporated herein.

TECHNICAL FIELD

The present invention relates to a fluid supply apparatus, and more particularly, to a fluid supply apparatus for supplying a liquid for rearing organisms such as mice.

BACKGROUND ART

Recent years have seen experiments conducted for the purpose of studying the effects of a zero gravity environment or a microgravity environment on organisms in outer space so as to rear organisms such as mice flown on a spacecraft such as a space shuttle in outer space. The rearing environment for mice or the like in outer space requires facilities for supplying mice or the like with water or liquid diet (hereinafter referred to as water or the like) in the same manner as in the case of rearing mice or the like on the ground (for example, see PTL 1). Examples of common facilities for supplying water or the like to mice or the like on the ground include an automatic fluid supply apparatus using gravity. However, such an automatic fluid supply apparatus using gravity cannot be used in a zero gravity environment.

Thus, there has been proposed a device for automatically supplying water or the like using a motor-driven syringe pump or the like as facilities for supplying water or the like to mice or the like in outer space.

CITATION LIST

Patent Literature

PTL 1: Japanese Patent Laid-Open No. 2002-017191

SUMMARY OF INVENTION

Technical Problem

However, such a motor-driven device requires a power supply source and has a relatively heavy weight and large footprint. Therefore, it is not preferable to install such a motor-driven device in a spacecraft with limited loading weight and loading space. In addition, motor-driven devices may fail. A failure of the motor-driven device requires a repair by an astronaut and involves a time-consuming maintenance and management effort.

An object of the present invention is to provide a fluid supply apparatus that can solve problems of the prior art described above, eliminate the need for a power supply source, and store fluid efficiently.

Solution to Problem

The present invention provides a fluid supply apparatus for supplying stored fluid to outside comprising a first balloon that is formed of an elastic body to be capable of storing the fluid, a second balloon that is formed of an elastic body to be capable of storing the fluid, and has a larger contraction force than a contraction force of the first balloon, a support member that supports both of the first balloon and the second balloon, and a casing that houses the first balloon and the second balloon, and defines inflation ranges of the first balloon and the second balloon, wherein the support member has a flow path formed to permit fluid communication between an interior of the first balloon and an interior of the second balloon.

In this case, the support member includes a connection portion that connects an end of the first balloon and an end of the second balloon, the ends being adjacent to each other, and the flow path may be formed in the connection portion. The support member is a tubular member, and may extend through the first balloon and the second balloon. The support member may extend from one end to the other end of the casing. The support member has a plate shape, and the first balloon may be attached to one surface of the support member and the second balloon may be attached to the other surface of the support member. The casing may be provided with a sensor for detecting that at least one of the first balloon and the second balloon has contacted the casing.

The present invention provides a fluid supply apparatus for supplying stored fluid to outside comprising a first unit that comprises a first balloon that is formed of an elastic body to be capable of storing the fluid, a first support member that supports the first balloon, and a first casing that houses the first balloon and defines an inflation range of the first balloon, and a second unit that comprises a second balloon that is formed of an elastic body to be capable of storing the fluid and has a larger contraction force than a contraction force of the first balloon, a second support member that supports the second balloon, and a second casing that houses the second balloon and defines an inflation range of the second balloon, wherein the first support member and the second support member have a flow path formed to permit fluid communication between an interior of the first balloon and an interior of the second balloon.

In this case, the first casing may be provided with a sensor for detecting that the first balloon has contacted the first casing. The second casing may be provided with a sensor for detecting that the second balloon has contacted the second casing.

In the above-described invention, the first balloon and the second balloon may be different from each other in thickness. The first balloon and the second balloon may be different from each other in inner diameter. The first balloon and the second balloon may be different from each other in length.

DESCRIPTION OF EMBODIMENTS

Hereinafter, preferred embodiments of the present embodiment will be described with reference to the drawings.

First Embodiment

Figure 1:
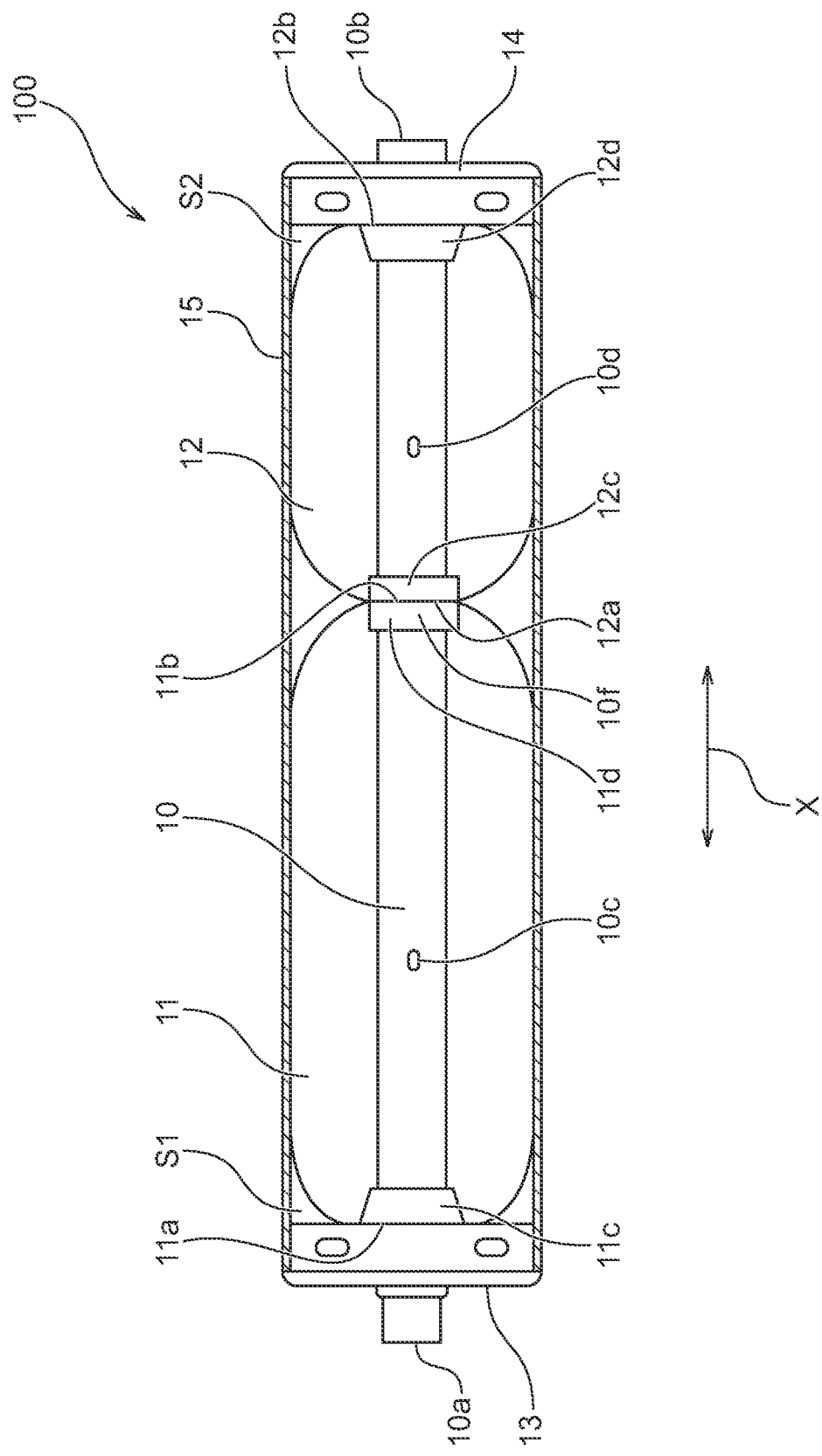
FIG. 1 illustrates a front view of a fluid supply apparatus according to a first embodiment of the present invention.
Figure 2:
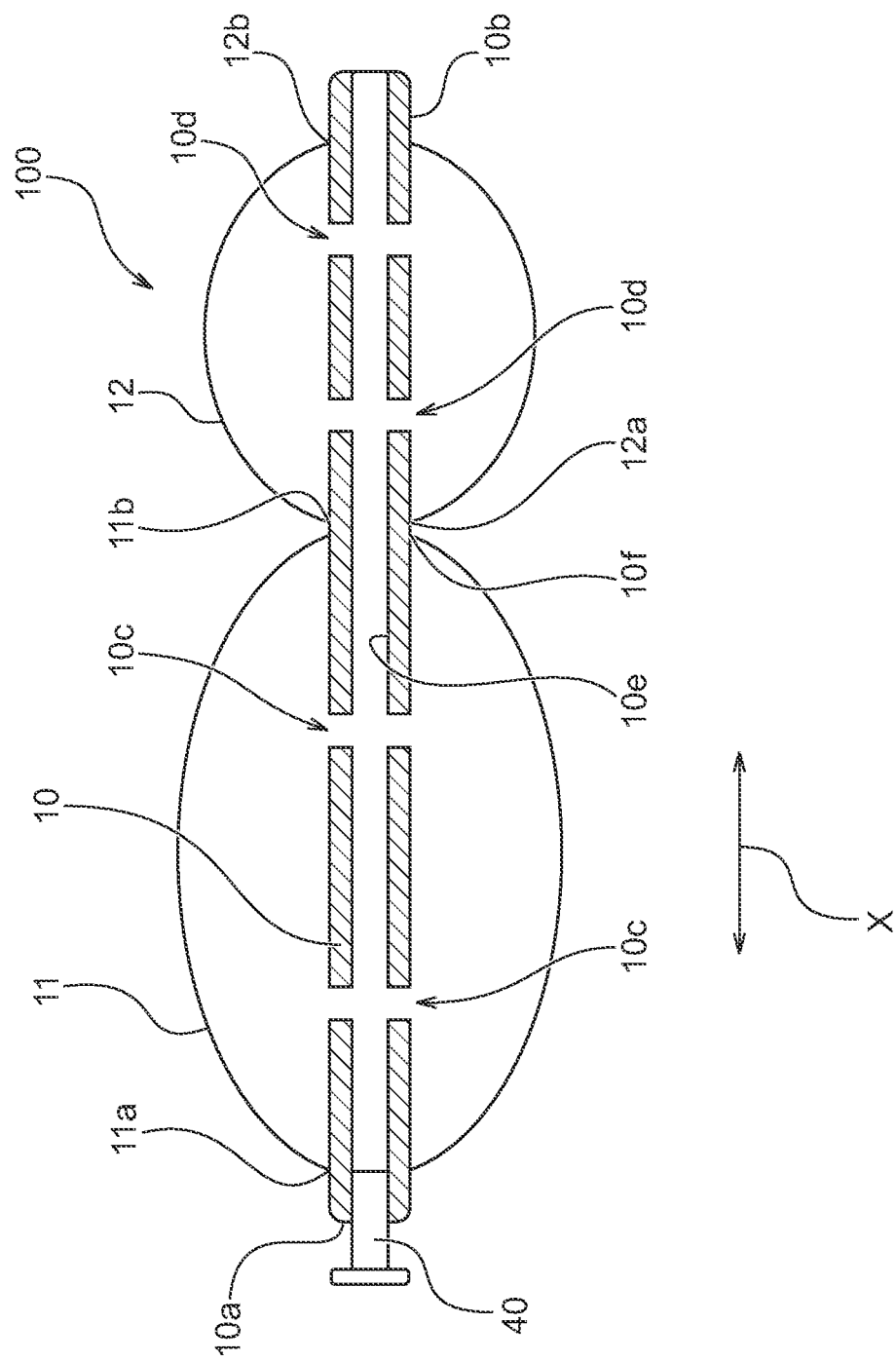
FIG. 2 schematically illustrates a cross section of a shaft and balloons.
Figure 3A:
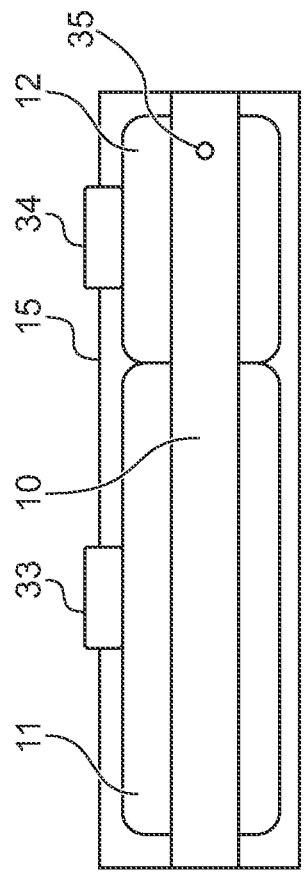
FIG. 3A schematically illustrates the fluid supply apparatus and sensors.
Figure 3B:
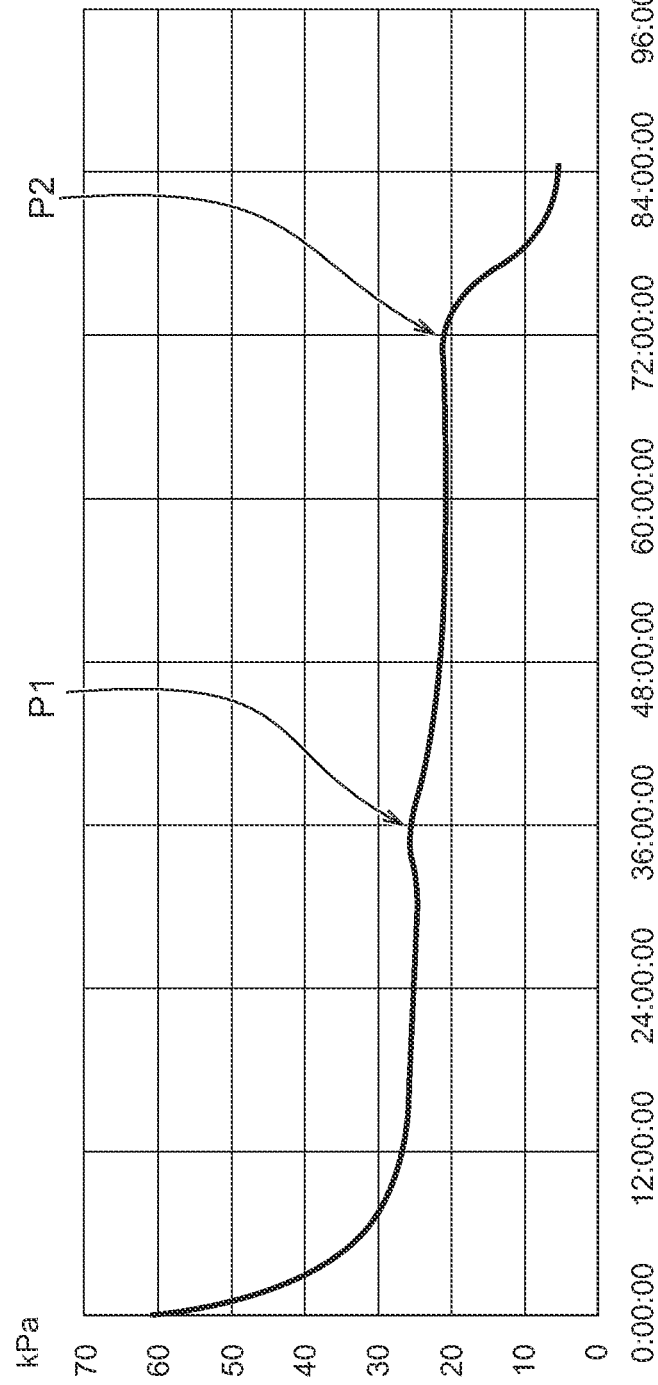
FIG. 3B is a graph showing the change in an internal pressure with the change in elapsed time of discharge.

FIG. 1 illustrates a front view of a fluid supply apparatus according to a first embodiment of the present invention. FIG. 2 schematically illustrates a cross section of a shaft and balloons, FIG. 3A schematically illustrates the fluid supply apparatus and sensors, and FIG. 3B is a graph showing the change in an internal pressure with the change in elapsed time of discharge.

A fluid supply apparatus 100 according to the present embodiment is used, for example, in outer space to supply water or liquid diet (organism rearing liquid, hereinafter referred to as water or the like) to organisms such as mice to be reared in outer space. In particular, the fluid supply apparatus 100 according to the present embodiment may be mounted on a spacecraft for launch and/or recovery.

As illustrated in FIG. 1, the fluid supply apparatus 100 comprises a shaft 10 (support member), a first balloon 11, a second balloon 12, a first cap 13, a second cap 14, and a case (casing) 15.

The case 15 has a cylindrical shape formed of a transparent resin material. In the case 15, the first cap 13 is incorporated at one end, and the second cap 14 is incorporated at the other end. The first balloon 11 and the second balloon 12 are supported by the shaft 10 supported by the first cap 13 and second cap 14. An inner peripheral surface of the case 15 is formed so as to contact the first balloon 11 and the second balloon 12 inflated by injecting water or the like. Thus, the case 15 is adapted to define inflation ranges of the first balloon 11 and the second balloon 12.

The first balloon 11 is formed to be inflated into an apple-like shape in which a portion on the first cap 13 side is recessed in a longitudinal direction x, and the second balloon 12 is formed to be inflated into an apple-like shape in which a portion on the second cap 14 side is recessed in the longitudinal direction x. Each diameter of the first balloon 11 and the second balloon 12 becomes smaller as compared with the case where one balloon is used in place thereof, which contributes to an increase in curvature of the surface and a decrease in corners S1 and S2 generated at both ends of the case 15 when the first balloon 11 and the second balloon 12 are inflated, so that a space in the case 15 can be used efficiently.

The first balloon 11 and the second balloon 12 are formed of an elastic member, and the material thereof is not limited to particular materials, but from the viewpoint of biocompatibility, for example, silicone rubber or the like is preferable. The first balloon 11 and the second balloon 12 are formed to be able to store therein water or the like to be supplied to organisms such as mice and are provided to be able to discharge the water or the like therefrom.

The second balloon 12 has a larger contraction force than that of the first balloon 11. The first balloon 11 according to the present embodiment is formed to have a full length longer than that of the second balloon 12, that is, the first balloon 11 and the second balloon 12 are attached to the shaft 10 so that the first balloon 11 is longer than the second balloon 12 along the shaft 10 in the longitudinal direction x.

Note that in the present embodiment, the second balloon 12 is formed to be shorter than the first balloon 11 in the longitudinal direction x so that the second balloon 12 has a larger contraction force than that of the first balloon 11, but is not limited thereto. In the case where the contraction force of the second balloon 12 is set to be larger than that of the first balloon 11, the first balloon 11 and the second balloon 12 may be made different from each other in thickness and inner diameter.

The first balloon 11 has a first hole 11a formed at one end, and a second hole 11b formed at the other end. The shaft 10 extends through the first hole 11a and the second hole 11b. The first hole 11a and the second hole 11b are provided with shaft members 11c and 11d, respectively, the shaft members 11c and 11d each having a cylindrical shape protruding inwardly of the first balloon 11 from a corresponding end of the first balloon 11. The first balloon 11 is formed to be in close contact with an outer peripheral surface of the shaft 10 extending therethrough using the shaft members 11c and 11d.

Like the first balloon 11, the second balloon 12 also has a first hole 12a formed at one end, and a second hole 12b formed at the other end. The shaft 10 extends through the first hole 12a and the second hole 12b. The first hole 12a and the second hole 12b are provided with shaft members 12c and 12d, respectively, the shaft members 12c and 12d each having a cylindrical shape protruding inwardly of the second balloon 12 from a corresponding end of the second balloon 12. The second balloon 12 is formed to be in close contact with the outer peripheral surface of the shaft 10 extending therethrough using the shaft members 12c and 12d.

As illustrated in FIG. 1, the first balloon 11 and the second balloon 12 are attached to be adjacent to each other in the longitudinal direction x of the shaft 10. In the present embodiment, the first balloon 11 is disposed on an injection port 10a side of the shaft 10, and the second balloon 12 is disposed on a discharge port 10b side of the shaft 10. Thus, the shaft member 11d of the first balloon 11 and the shaft member 12c of the second balloon 12 contact each other, and the first balloon 11 and the second balloon 12 are provided to expand and inflate in a direction away from the shaft 10 from between the shaft member 11d of the first balloon 11 and the shaft member 12c of the second balloon 12. Thus, as the first balloon 11 and the second balloon 12 inflate, a region in which the first balloon 11 and the second balloon 12 are in close contact with each other increases around the shaft member 11d of the first balloon 11 and the shaft member 12c of the second balloon 12. Note that FIG. 1 illustrates a state in which the first balloon 11 and the second balloon 12 are inflated, but in the state of contracting, each of the first balloon 11 and the second balloon 12 is in substantially close contact with the shaft 10.

The shaft 10 is a tubular member having a cylindrical shape. The shaft 10 extends from one end to the other end in the longitudinal direction x of the case 15, and as illustrated in FIG. 2, a flow path 10e in which the water flows is formed along the shaft center. One end of the shaft 10 has the discharge port 10b for discharging the water or the like stored in the first balloon 11 and the second balloon 12. On the other hand, the other end of the shaft 10 has the injection port 10a for injecting the water or the like into the interior of the first balloon 11 and the interior of the second balloon 12. The flow path 10e is formed to extend from the injection port 10a to the discharge port 10b.

The injection port 10a according to the present embodiment is adapted to be connected with a one-way valve 40 for preventing the water or the like in the shaft 10 from flowing out from the shaft 10, but a one-way valve may be incorporated into the injection port 10a itself. The injection port 10a is provided to be connected with an unillustrated pipe or the like via the one-way valve.

The shaft 10 has a first communication hole 10c formed to directly connect an interior space of the shaft 10 formed into a cylindrical shape and the flow path 10e in an interior space of the first balloon 11, thereby permitting fluid communication therebetween. In addition, the shaft 10 has a second communication hole 10d formed to directly connect an interior space of the shaft 10 formed into a cylindrical shape and an interior space of the second balloon 12, thereby permitting fluid communication therebetween.

The shaft 10 includes a connection portion 10f that connects an end of the first balloon 11 and an end of the second balloon 12, the ends being adjacent to each other, or connects the shaft member 11d (see FIG. 1) of the first balloon 11 and the shaft member 12c (see FIG. 1) of the second balloon 12, and the flow path 10e is also formed in the connection portion 10f. The connection portion 10f is formed into a cylindrical shape, and an outer peripheral surface of the cylindrical shape portion is formed to have an outer diameter enabling the shaft member 11d of the first balloon 11 to be in close contact with the shaft member 12c of the second balloon 12. Note that the shaft 10 according to the present embodiment is formed into a cylindrical shape having a constant outer diameter from the first hole 11a of the first balloon 11 to the second hole 12b of the second balloon 12, but is not limited thereto, and a portion between the shaft member 11c (see FIG. 1) and the shaft member 11d (see FIG. 1) of the first balloon 11 may have different outer diameters and different outer peripheral shapes. The fluid supply apparatus 100 has the connection portion 10f, thereby permitting fluid communication between the first balloon 11 and the second balloon 12 as well as fluid communication between the discharge port 10b and the injection port 10a.

As illustrated in FIG. 1, the case 15 is formed into a cylindrical shape formed of a transparent resin material. Note that the case 15 may be formed into not only a cylindrical shape but also any tube shape such as a tube shape having a polygonal cross-section as long as it has a tubular shape. The shaft 10, the first balloon 11, and the second balloon 12 are disposed in the case 15. The first cap 13 is attached to the case 15 so that one opening of the case 15 is closed. Also, the second cap 14 is attached to the case 15 so that the other opening of the case 15 is closed. Accordingly, both ends of the shaft 10 protrude outward from both ends in the longitudinal direction x of the case 15.

Hereinafter, there will be described a procedure for storing water or the like in the fluid supply apparatus 100 and a procedure of discharging the water or the like from the fluid supply apparatus 100. In order to store water or the like in the fluid supply apparatus 100, an unillustrated liquid source is connected to the injection port 10a of the shaft 10 to inject the water or the like from the injection port 10a into the shaft 10. In the present embodiment, the contraction force of the first balloon 11 is smaller than the contraction force of the second balloon 12, and therefore, the water or the like injected into the shaft 10 is injected into the first balloon 11 through the first communication hole 10c. At this time, the first balloon 11 inflates according to an injection amount of water or the like.

When the first balloon 11 is inflated until the outer peripheral surface thereof contacts the inner peripheral surface of the case 15, the water or the like being injected into the shaft 10 is injected into the second balloon 12, whereby the second balloon 12 inflates according to the injection amount of water or the like.

When the second balloon 12 is inflated until the outer peripheral surface thereof contacts the inner peripheral surface of the case 15, the injection of the water into the fluid supply apparatus 100 is completed.

As illustrated in FIG. 3A, the fluid supply apparatus 100 according to the present embodiment is provided with a first pressure sensor 33 for detecting that the first balloon 11 has contacted the case 15, a second pressure sensor 34 for detecting that the second balloon 12 has contacted the case 15, and a third pressure sensor 35 for detecting an internal pressure in the flow path 10e, the third pressure sensor 35 being incorporated into the flow path 10e of the shaft 10. A user of the fluid supply apparatus 100 can determine whether the outer peripheral surfaces of the first balloon 11 and the second balloon 12 have contacted the inner peripheral surface of the case 15, on the basis of the detection results of the first pressure sensor 33 and the second pressure sensor 34, and detect the pressure of the liquid stored in the fluid supply apparatus 100 on the basis of the detection result of the third pressure sensor 35.

When the water or the like is supplied to organisms such as mice, a valve of the unillustrated pipe or the like connected to the shaft 10 is opened. Then, the contraction forces of the first balloon 11 and the second balloon 12 cause the water or the like inside the first balloon 11 and the second balloon 12 to be discharged from the discharge port 10b into the pipe, whereby the water or the like can be automatically supplied to organisms such as mice.

When the water or the like inside the first balloon 11 and the second balloon 12 is discharged from the discharge port 10b, the internal pressure of the first balloon 11 changes as shown in FIG. 3B. In this figure, the vertical axis represents the internal pressure (kPa) and the horizontal axis represents the elapsed time (hr). Note that, in FIG. 3B, the description is made using the internal pressure of the first balloon 11, but is not limited thereto, and may be made using the internal pressure of the second balloon 12.

In order to discharge the water from the discharge port 10b of the fluid supply apparatus 100, the water or the like stored in the second balloon 12 having a larger contraction force than that of the first balloon 11 is first discharged from the discharge port 10b. When the discharge of the water or the like stored in the second balloon 12 is completed and is switched to the discharge of the water or the like stored in the first balloon 11, or when about 36 hours have elapsed in FIG. 3B, the internal pressure of the first balloon 11 rises and a first peak P1 occurs. Thus, the user of the fluid supply apparatus 100 can detect the first peak P1 using the third pressure sensor 35 without visually observing the first balloon 11 and the second balloon 12, thereby determining that the balloon from which the water or the like is discharged has switched from the second balloon 12 to the first balloon 11.

When the discharge of the water or the like from the second balloon 12 is completed, the fluid supply apparatus 100 starts to discharge the water or the like stored in the first balloon 11. At this time, the internal pressure of the first balloon 11 decreases with the discharge of the water or the like, but when the discharge of the water or the like stored in the first balloon 11 is completed, or when about 72 hours have elapsed in FIG. 3B, the internal pressure of the first balloon 11 slightly rises and a second peak P2 occurs. The user of the fluid supply apparatus 100 can detect the second peak P2 using the third pressure sensor 35 without visually observing the first balloon 11 and the second balloon 12, thereby determining that the water or the like stored in the first balloon 11 would soon be exhausted. Note that, in the present embodiment, storage amounts of the first balloon 11 and the second balloon 12 are determined using the third pressure sensor 35, but a decrease in the storage amount of the first balloon 11 may be determined using the first pressure sensor 33 and a decrease in the storage of the second balloon 12 may be determined using the second pressure sensor 34.

The fluid supply apparatus 100 according to the present embodiment comprises the first balloon 11 that is formed of an elastic body to be capable of storing water and the like, the second balloon 12 that is formed of an elastic body to be capable of storing water and the like, and has a larger contraction force than the contraction force of the first balloon 11, the shaft 10 that supports both of the first balloon 11 and the second balloon 12, and the case 15 that houses the first balloon 11 and the second balloon 12 and defines inflation ranges of the first balloon 11 and the second balloon 12, wherein the shaft 10 has the flow path 10e formed to permit fluid communication between the interior of the first balloon 11 and the interior of the second balloon 12. Thus, each diameter of the subdivided first balloon 11 and second balloon 12 becomes smaller as compared with the case where one balloon is used in place thereof, which contributes to an increase in curvature of the surface and a decrease in corners S1 and S2 generated at both ends of the case 15 when the first balloon 11 and the second balloon 12 are inflated, so that a space in the case 15 can be used efficiently. This makes it possible to eliminate the need for a power supply source and store fluid efficiently.

The fluid supply apparatus 100 according to the present embodiment in which the second balloon 12 has a larger contraction force than that of the first balloon 11 can control order in which the first balloon 11 and the second balloon 12 inflate and contract, so that the second balloon 12 contracts earlier than the first balloon 11 and the first balloon inflates earlier than the second balloon 12.

Furthermore, contracting a plurality of balloons in order enables the fluid supply apparatus 100 according to the present embodiment to monitor a gradual decrease in the water or the like stored in the fluid supply apparatus 100.

Also, the fluid supply apparatus 100 according to the present embodiment comprises the first balloon 11 having a small contraction force, which enables the balloons to inflate smoothly even when the fluid is injected at a low pressure. This enables the balloons to inflate more easily than the case where only one balloon is provided and to inflate to fill in the corners S1 and S2 without excessively increasing the pressure of the fluid, thereby reducing the loads to the balloons.

Second Embodiment

Figure 4:
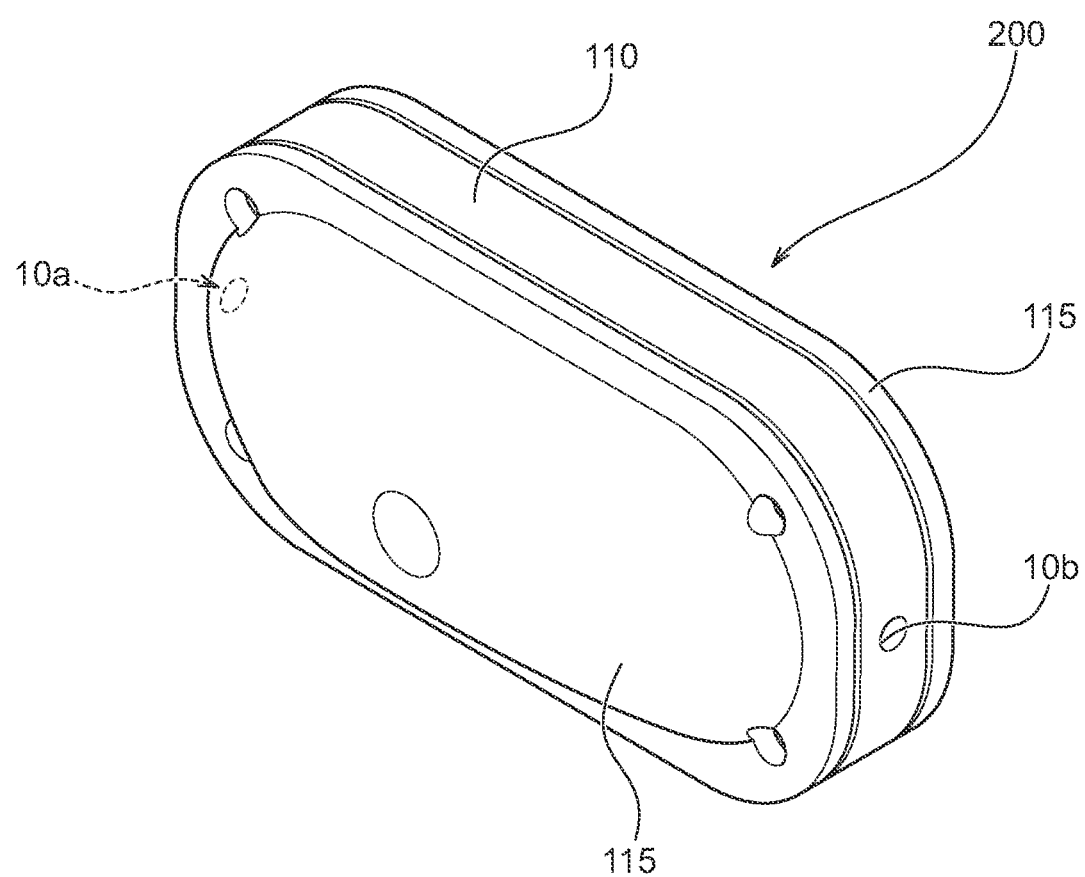
FIG. 4 illustrates a perspective view of a fluid supply apparatus according to a second embodiment of the present invention.
Figure 5:
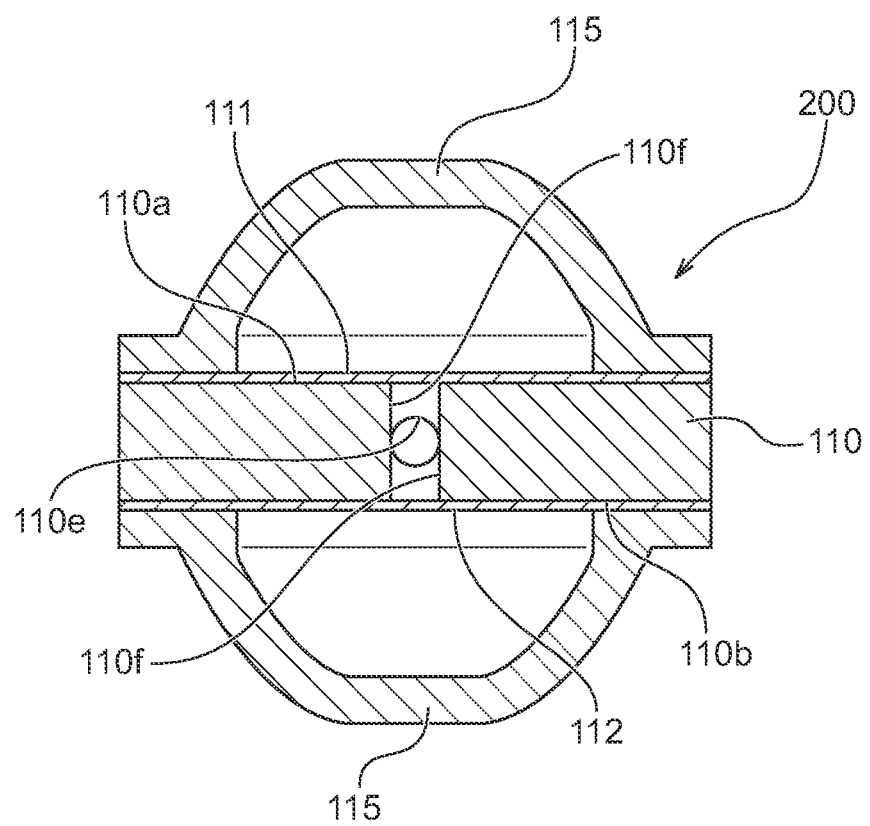
FIG. 5 illustrates a cross section of the fluid supply apparatus according to the second embodiment of the present invention.
Figure 6:
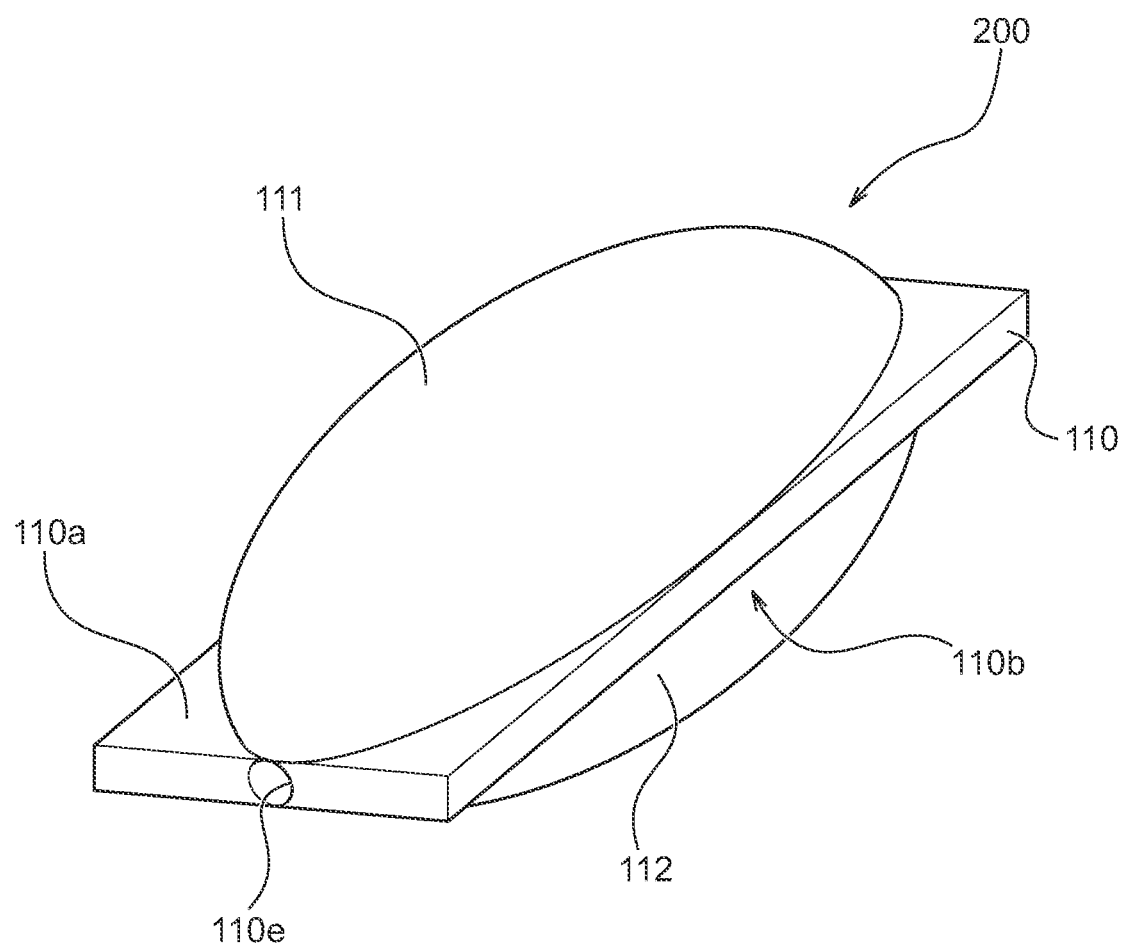
FIG. 6 illustrates a schematic perspective view through the fluid supply apparatus in which balloons are inflated.
Figure 7:
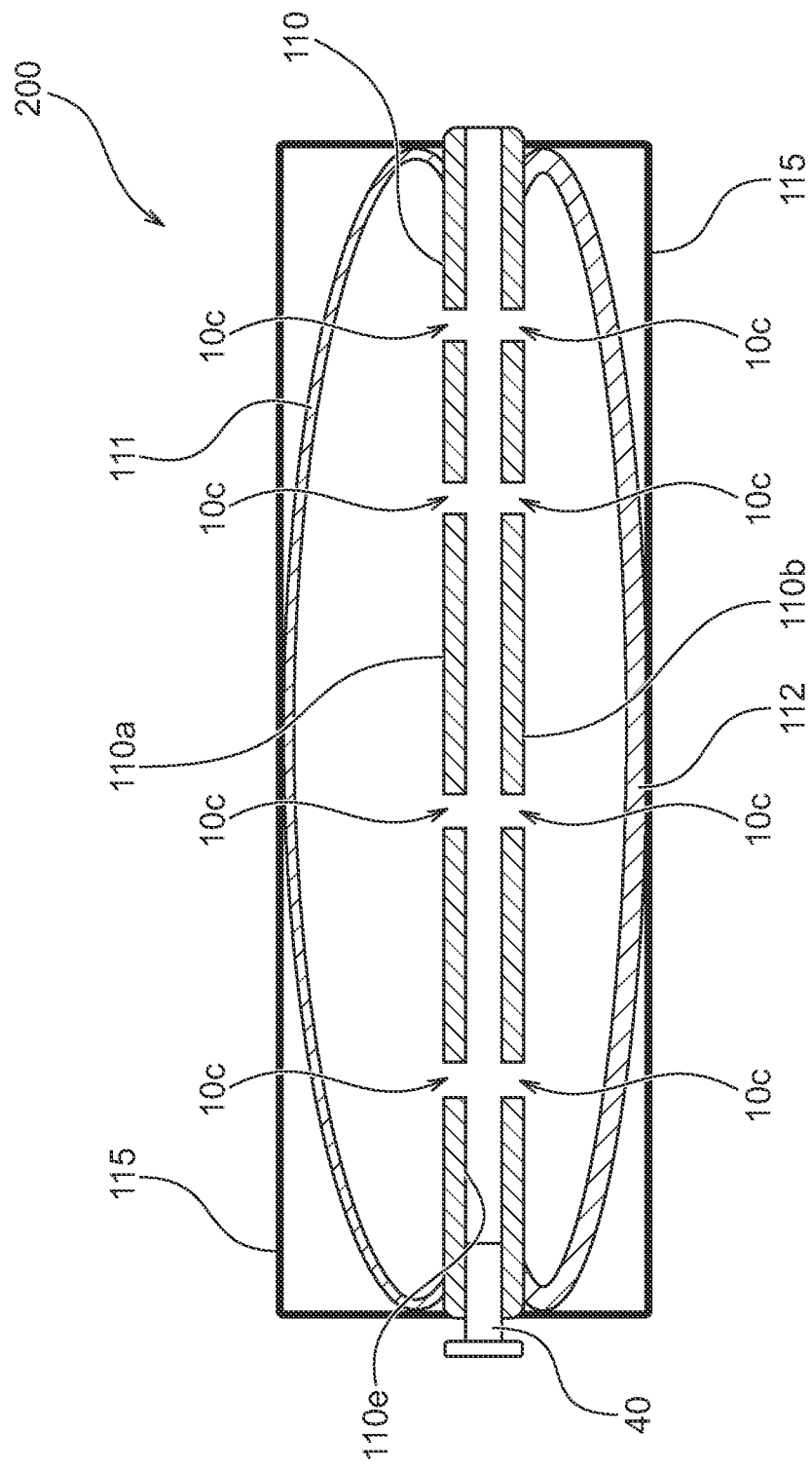
FIG. 7 illustrates a schematic sectional view of the fluid supply apparatus in which balloons are inflated.

FIG. 4 illustrates a perspective view of a fluid supply apparatus according to a second embodiment of the present invention, FIG. 5 illustrates a cross section of the fluid supply apparatus according to the second embodiment, FIG. 6 illustrates a schematic perspective view through the fluid supply apparatus in which balloons are inflated, and FIG. 7 illustrates a schematic sectional view of the fluid supply apparatus in which balloons are inflated. Note that, in the second embodiment, parts different from the first embodiment are described, and the configurations in the drawings, which are substantially the same as the first embodiment, are denoted with the same reference signs.

As illustrated in FIG. 4, a fluid supply apparatus 200 according to the present embodiment comprises a support plate (support member) 110 having a plate shape, and a pair of cases (casings) 115 and 115 formed to cover both surfaces of the support plate 110.

As illustrated in FIG. 5, the cases 115 and 115 each have a shape inflated in the direction away from the support plate 110, and a cavity is formed between the support plate 110 and each of the cases 115 and 115. In the cases 115 and 115, a first balloon 111 is attached to one surface 110a of the support plate 110, and a second balloon 112 is attached to the other surface 110b of the support plate 110, the second balloon 112 having a larger contraction force than that of the first balloon 111.

The support plate 110 has a flow path 110e formed to extend in an in-plane direction with respect to the surfaces 110a and 110b, and the flow path 110e is in fluid communication with the discharge port 10b and the injection port 10a. The flow path 110e branches near the center of the support plate 110 to form a branch path 110f extending in an out-of-plane direction with respect to the surfaces 110a and 110b, and the branch path 110f is in fluid communication with the interior of the first balloon 111 and the interior of the second balloon 112 in the surfaces 110a and 110b.

The first balloon 111 and the second balloon 112 are formed into a flat plate shape so as to be in close contact with the surfaces 110a and 110b of the support plate 110, respectively, in the state in which the first balloon 111 and the second balloon 112 are not inflated. The first balloon 111 and the second balloon 112 are adapted to inflate in the directions away from the surfaces 110a and 110b of the support plate 110, respectively, as illustrated in FIG. 6, when the fluid is injected into the first balloon 111 and the second balloon 112 through the flow path 110e and the branch path 110f. As illustrated in FIG. 7, the cases 115 and 115 are provided to define the inflation ranges of the first balloon 111 and the second balloon 112, and when being inflated, the first balloon 111 and the second balloon 112 come into close contact with their respective inner surfaces of the cases 115 and 115 so that the cases 115 and 115 limit the inflation of the first balloon 111 and the second balloon 112.

Hereinafter, there will be described the inflation of the first balloon 111 and the second balloon 112. When the first balloon 111 and the second balloon 112 inflate actually, the first balloon 111 first starts to inflate, and the first balloon 111 contacts the inner surface of the case 115.

When the first balloon 111 contacts the inner surface of the case 115, the second balloon 112 next starts to inflate, and the second balloon 112 contacts the inner surface of the case 115 and stops inflating.

Third Embodiment

Figure 8:
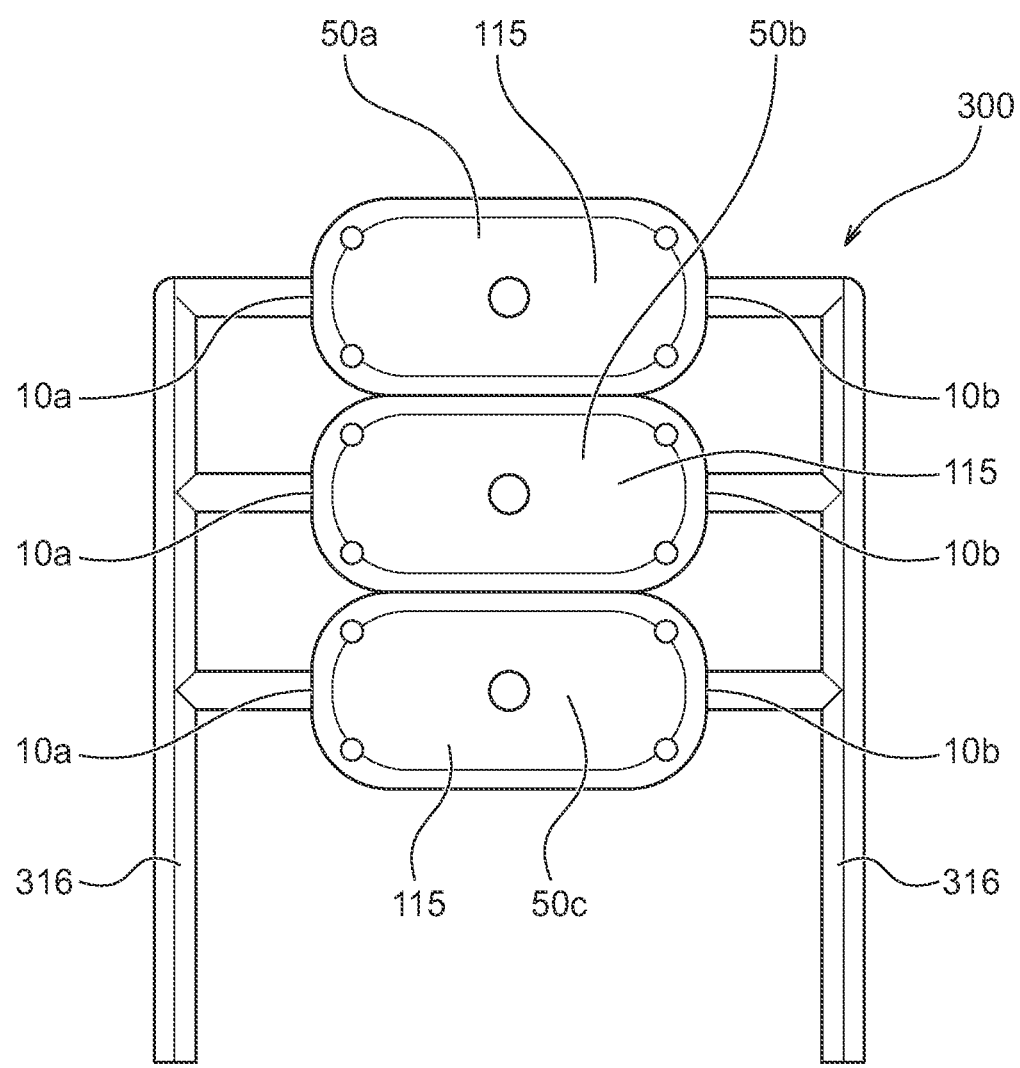
FIG. 8 illustrates a front view of a fluid supply apparatus according to a third embodiment of the present invention.
Figure 9:
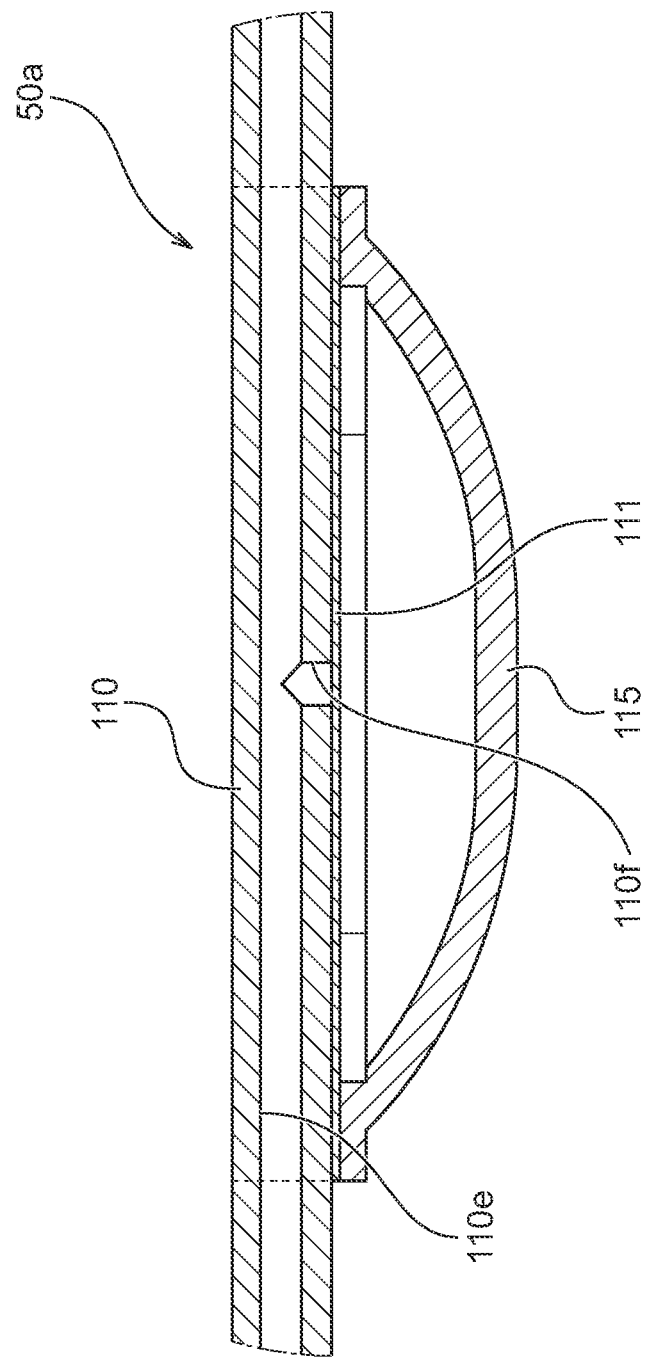
FIG. 9 illustrates a sectional view of a balloon unit.

FIG. 8 illustrates a front view of a fluid supply apparatus according to a third embodiment of the present invention, and FIG. 9 illustrates a sectional view of a balloon unit. Note that, in the third embodiment, parts different from the second embodiment are described, and the configurations in the drawings, which are substantially the same as the first embodiment, are denoted with the same reference signs.

As illustrated in FIG. 8, a fluid supply apparatus 300 according to the present embodiment comprises a first balloon unit 50a in which a first balloon 111 (see FIG. 9) is housed, a second balloon unit 50b in which a second balloon is housed, the second balloon having a larger contraction force than that of the first balloon 111, and a third balloon unit 50c in which a third balloon is housed, the third balloon having a larger contraction force than that of the second balloon. The balloons in the first balloon unit 50a, the second balloon unit 50b and the third balloon unit 50c are connected in parallel through a pipe 316. Note that the first balloon unit 50a, the second balloon unit 50b, and the third balloon unit 50c have substantially the same configuration and the balloons differ from one another only in the contraction force, and therefore, the description will be made below using the first balloon unit 50a.

The present embodiment is different from the second embodiment in that each of the first balloon unit 50a, the second balloon unit 50b, and the third balloon unit 50c houses only one balloon 111 as illustrated in FIG. 9.

When the fluid is injected into the pipe 316 and each of the balloons 111 in the first balloon unit 50a, the second balloon unit 50b, and the third balloon unit 50c inflates, the balloon 111 in the first balloon unit 50a first inflates until the balloon 111 in the first balloon unit 50a contacts the inner surface of the case 115. When the inflation of the balloon 111 in the first balloon unit 50a is completed, the balloon 111 in the second balloon unit 50b next inflates until the balloon 111 in the second balloon unit 50b contacts the inner surface of the case 115. When the inflation of the balloon 111 in the second balloon unit 50b is completed, the balloon 111 in the third balloon unit 50c next inflates until the balloon 111 in the third balloon unit 50c contacts the inner surface of the case 115, and the injection of the fluid into the fluid supply apparatus 300 is completed.

In order to discharge the fluid from the liquid supply apparatus 300, the balloon 111 in the third balloon unit 50c first contracts to discharge the fluid into the pipe 316. When the contraction of the balloon 111 in the third balloon unit 50c is completed, the balloon 111 in the second balloon unit 50b next contracts to discharge the fluid into the pipe 316. When the contraction of the balloon 111 in the second balloon unit 50b is completed, the balloon 111 in the first balloon unit 50a next contracts to discharge the fluid into the pipe 316.

Hereinbefore, the present invention has been described using the embodiments, but the present invention is not limited thereto. For example, in the above-described embodiments, the cases 15 and 115 are formed of a transparent resin material, but as long as the cases 15 and 115 can have rigidity enough to withstand the pressure applied by the inflated balloons, a transparent material may be used for only a part of the cases 15 and 115 or the entire cases 15 and 115 may be formed of a non-transparent material, for example.

REFERENCE SIGNS LIST

P1 . . . First peak
P2 . . . Second peak
S1 . . . Corner
10 . . . Shaft (support member)
10a . . . Injection port
10b . . . Discharge port
10c . . . First communication hole
10d . . . Second communication hole
10e . . . Flow path
10f . . . Connection portion
11 . . . First balloon
11a . . . First hole
11b . . . Second hole
11c . . . Shaft member
11d . . . Shaft member
12 . . . Second balloon
12a . . . First hole
12b . . . Second hole
12c . . . Shaft member
12d . . . Shaft member
13 . . . First cap
14 . . . Second cap
15 . . . Case (casing)
33 . . . First pressure sensor
34 . . . Second pressure sensor
35 . . . Third pressure sensor
40 . . . One-way valve
50a . . . First balloon unit
50b . . . Second balloon unit
50c . . . Third balloon unit
100 . . . Fluid supply apparatus
110 . . . Support plate
110a . . . Surface
110b . . . Surface
110e . . . Flow path
110f . . . Branch path
111 . . . First balloon
112 . . . Second balloon
115 . . . Case (casing)
200 . . . Fluid supply apparatus
300 . . . Fluid supply apparatus
316 . . . Pipe

What is claimed is:

1. A fluid supply apparatus for supplying stored fluid to outside, comprising:
    a first balloon that is formed of an elastic body to be capable of storing the fluid;
    a second balloon that is formed of an elastic body to be capable of storing the fluid, and has a larger contraction force than a contraction force of the first balloon;
    a support member that supports both of the first balloon and the second balloon; and
    a casing that houses the first balloon and the second balloon, and defines inflation ranges of the first balloon and the second balloon,
    wherein the support member has a flow path formed to permit fluid communication between an interior of the first balloon and an interior of the second balloon, and
    wherein the support member is a tubular member and extends through the first balloon and the second balloon.

2. The fluid supply apparatus according to claim 1, wherein
    the support member includes a connection portion that connects an end of the first balloon and an end of the second balloon, the ends being adjacent to each other, and the flow path is formed in the connection portion.

3. The fluid supply apparatus according to claim 1, wherein
    the support member extends from one end to the other end of the casing.

4. The fluid supply apparatus according to claim 1, wherein
    the support member has a plate shape, and the first balloon is attached to one surface of the support member and the second balloon is attached to the other surface of the support member.

5. The fluid supply apparatus according to claim 1, wherein
    the casing is provided with a sensor for detecting that at least one of the first balloon and the second balloon has contacted the casing.

6. The fluid supply apparatus according to claim 1, wherein
the first balloon and the second balloon are different from each other in thickness.

7. The fluid supply apparatus according to claim 1, wherein
the first balloon and the second balloon are different from each other in inner diameter.

8. The fluid supply apparatus according to claim 1, wherein
the first balloon and the second balloon are different from each other in length.

9. A fluid supply apparatus for supplying stored fluid to outside, comprising:
- a first unit that comprises a first balloon that is formed of an elastic body to be capable of storing the fluid, a first support member that supports the first balloon, and a first casing that houses the first balloon and defines an inflation range of the first balloon; and
- a second unit that comprises a second balloon that is formed of an elastic body to be capable of storing the fluid and has a larger contraction force than a contraction force of the first balloon, a second support member that supports the second balloon, and a second casing that houses the second balloon and defines an inflation range of the second balloon, wherein the first support member and the second support member have a flow path formed to permit fluid communication between an interior of the first balloon and an interior of the second balloon.

10. The fluid supply apparatus according to claim 9, wherein
the first casing is provided with a sensor for detecting that the first balloon has contacted the first casing.

11. The fluid supply apparatus according to claim 9, wherein
the second casing is provided with a sensor for detecting that the second balloon has contacted the second casing.

12. The fluid supply apparatus according to claim 9, wherein
the first balloon and the second balloon are different from each other in thickness.

13. The fluid supply apparatus according to claim 9, wherein
the first balloon and the second balloon are different from each other in inner diameter.

14. The fluid supply apparatus according to claim 9, wherein
the first balloon and the second balloon are different from each other in length.

\* \* \* \* \*